US006427996B1

(12) United States Patent
Niedzielski

(10) Patent No.: US 6,427,996 B1
(45) Date of Patent: Aug. 6, 2002

(54) WORKPIECE TRANSFER SUPPORT APPARATUS

(75) Inventor: James H. Niedzielski, Fenton, MI (US)

(73) Assignee: Atlas Technologies, Inc., Fenton, MI (US)

( * ) Notice: Subject to any disclaimer, the term of this patent is extended or adjusted under 35 U.S.C. 154(b) by 0 days.

(21) Appl. No.: 09/704,170

(22) Filed: Nov. 1, 2000

(51) Int. Cl.[7] .................................................. B23Q 3/00

(52) U.S. Cl. ........................ 269/309; 269/329; 269/900

(58) Field of Search .............................. 269/309, 16, 5, 269/8, 287, 900, 329, 909; 29/281.1

(56) References Cited

U.S. PATENT DOCUMENTS

| | | | |
|---|---|---|---|
| 1,062,448 A | | 5/1913 | Fish |
| 1,407,668 A | | 2/1922 | McCallum |
| 1,596,708 A | | 8/1926 | Bellows |
| 1,940,455 A | | 12/1933 | Kilpela |
| 1,958,817 A | | 5/1934 | Gase |
| 2,128,116 A | | 8/1938 | Boone |
| 2,812,962 A | | 11/1957 | Parkes |
| 3,156,418 A | | 11/1964 | Jablonski et al. |
| 3,406,990 A | | 10/1968 | Brennan |
| 3,557,419 A | | 1/1971 | Flannery |
| 3,664,677 A | | 5/1972 | Sunderman et al. |
| 3,848,388 A | | 11/1974 | Brétché |
| 5,171,003 A | * | 12/1992 | Kull ............................ 269/97 |
| 5,314,273 A | | 5/1994 | Nakayama et al. |
| 5,346,328 A | | 9/1994 | Vaders |
| 5,529,385 A | | 6/1996 | Tsao |
| 5,662,317 A | * | 9/1997 | Beakes et al. .............. 269/309 |
| 6,065,744 A | * | 5/2000 | Lawrence ................... 269/287 |
| 6,276,047 B1 | * | 8/2001 | Webster et al. ............... 29/559 |

* cited by examiner

*Primary Examiner*—Joseph J. Hail, III
*Assistant Examiner*—Lee Wilson
(74) *Attorney, Agent, or Firm*—Reising, Ethington, Barnes, Kisselle, Learman & McCulloch, P.C.

(57) ABSTRACT

Workpiece transfer support apparatus has a housing having a chamber therein for the removable accommodation of a support body which may be equipped with a workpiece engaging and supporting member. That portion of the support body which is accommodated in the chamber is engaged by and urged into a seating position with seating surfaces within the chamber. A locking bolt is movable into and out of engagement with the support member when the latter is within the chamber and acts on such support member to maintain it in snug engagement with the seating surfaces. A safety latch is provided to avoid inadvertent removal of the support body from the chamber of the housing.

14 Claims, 4 Drawing Sheets

2
3
4
6
7
8
9
11
11
13
14
15
18
19
21
21
22
23
24
25
26
26
27
28
29
33
35
36
41
50
50

WORKPIECE TRANSFER SUPPORT APPARATUS

This invention relates to workpiece transfer support apparatus of the kind especially adapted for use in supporting a workpiece during transfer through successive stations at each of which the workpiece is subjected to a cutting or forming operation.

BACKGROUND OF THE INVENTION

In automated workpiece forming operations it is conventional to transfer a workpiece from one end of a press or a line of presses, for example, to successive stations at each of which a different operation is performed on the workpiece. Transfer of a workpiece conventionally is achieved by lifting the workpiece, advancing the workpiece from one station to another, and lowering the workpiece following its transfer to the next successive station. During these operations the workpiece is engaged by movable tooling or fingers which support the workpiece during its transfer from one station to another.

Workpieces of the kind referred to vary in size and shape from one production run to another. Accordingly, the workpiece supporting tooling must be capable of assuming a wide variety of different positions so as to be able to support workpieces of greatly differing sizes and shapes.

When it becomes necessary to condition the press line to accommodate workpieces different from those involved in an earlier production run, it not only is necessary to change the cutting or forming dies, but also the workpiece supporting tooling to accommodate the different workpieces. In tooling supports in use heretofore it has been necessary to make the necessary adjustments while the tooling supports remain mounted on the transfer apparatus. This has resulted in time consuming, laborious adjustments having to be made and frequently required the person making the adjustments to assume awkward, uncomfortable positions. The tediousness of the changeover operation in many instances caused imperfect adjustments to be made, thereby resulting in the necessity of having to cycle the transfer apparatus repeatedly so that proper adjustments could be made.

A principal object of the invention is to provide tooling transfer support apparatus which overcomes the disadvantages of that previously in use.

SUMMARY OF THE INVENTION

Apparatus constructed in accordance with a preferred embodiment of the invention has a mounting base or housing adapted to be mounted on a transfer rail of machinery for transferring a workpiece from one station to another. The base or housing has walls defining a chamber having at one end an opening through which a body portion of a tooling support may pass freely. One end of the support body is provided with means for coupling the body to a tooling support arm assembly, whereas that end of the body, when in the chamber, occupies a position in which it seats securely on that end of the chamber opposite the open end and on a seating surface which spans the distance between the open end and the closed end of the chamber.

A locking bolt bears against that part of the tooling support body which occupies the chamber and is operable to seat the body on the seating surface within the chamber and on that wall of the housing which is opposite the open end of the latter. The locking bolt urges the tool support in the direction of its seating surfaces within the chamber so that the locked position of the tool support within the chamber always is the same in all three axes of possible motion.

A spring latch is provided as a safeguard to ensure fail-safe retention of the tooling support within the chamber. The spring latch also ensures that the tooling support body is properly positioned within the chamber prior to tightening the locking bolt.

The provision of a tooling support which is separable from its mounting base or housing makes possible the preassembly of the several parts of the tooling support arm following which the assembled parts can be fitted into the housing, thereby greatly facilitating the changeover from one set of tooling to another.

THE DRAWINGS

A preferred embodiment of the invention is illustrated in the accompanying drawings wherein.

DETAILED DESCRIPTION

Figure 1:
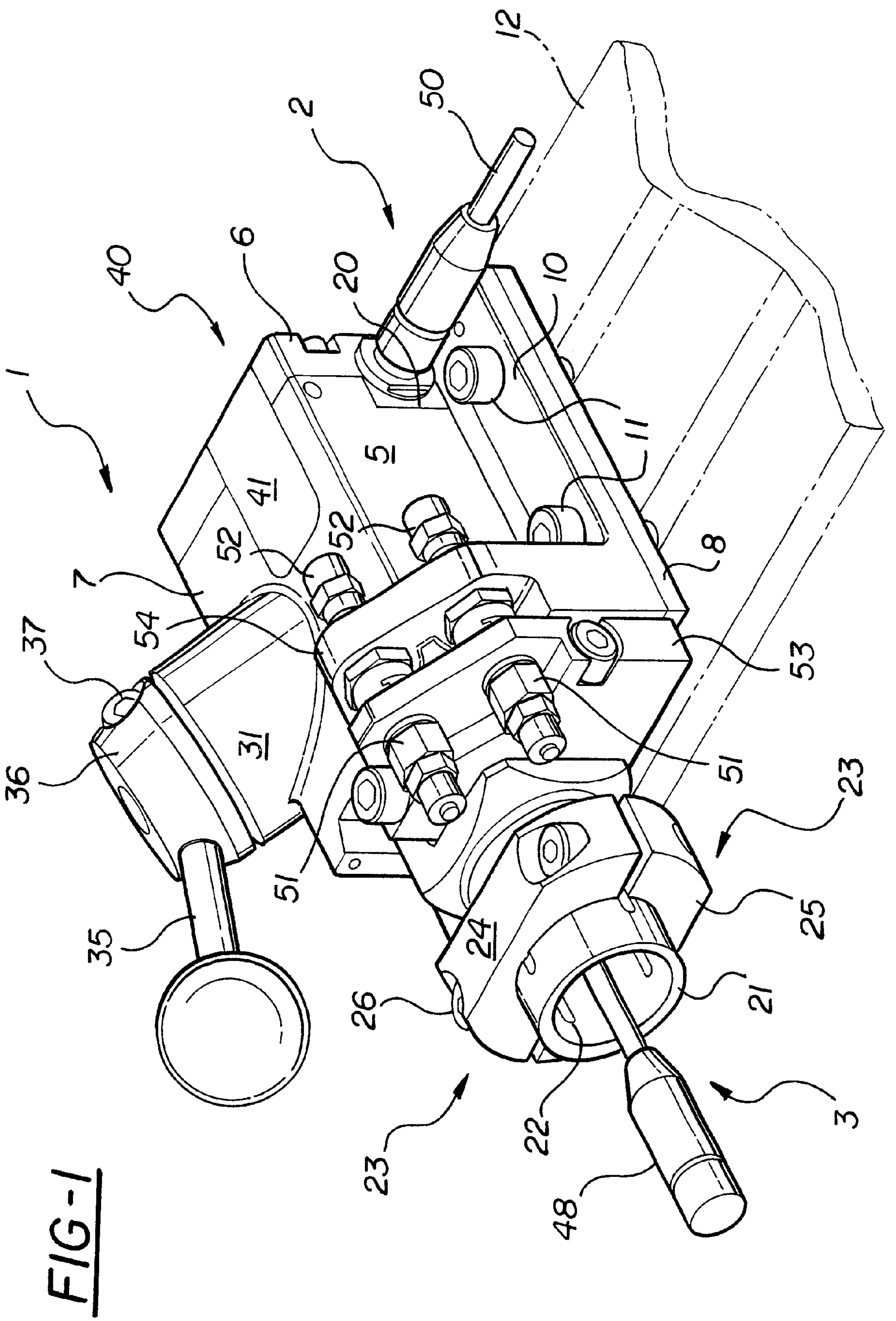
FIG. 1 is an isometric view of a base within which is accommodated a tooling support body.

Tooling support apparatus constructed in accordance with the disclosed embodiment is designated generally by the reference character 1 and comprises a base or housing 2 and a tooling support body 3 a portion of which is movable into and out of the housing 2.

The housing 2 comprises parallel side walls 4 and 5, a rear wall 6, a top wall 7 and a bottom wall 8. The side walls 4 and 5 have flanges 9 and 10, respectively, which rest upon the bottom wall 8 and mount bolts 11 by means of which the housing 2 may be secured to a movable transfer rail 12 of transfer apparatus of the kind disclosed in U.S. Pat. No. 4,887,466, for example, so that the housing 2 and whatever is supported thereby partakes of the movement of the transfer rail. The walls of the housing form a chamber 13 open at one end and closed at its opposite end by the rear wall 6.

The tooling support 3 has a body 14 at one end thereof, the body having side walls 15,16, a bottom wall 17, and a top wall 18. The body 14 also has a rear wall 19 provided with a notch 20 for a purpose presently to be explained.

At the forward end of the body 14 is secured a forwardly extending, radially compressible and expansible coupling sleeve 21 having axially extending slots 22 therein. The sleeve 21 is encircled by a clamp collar 23 having two opposed parts 24 and 25 which are movable toward and away from one another in response to the rotation of adjusting screws 26.

A transversely inclined clearance surface 27 is provided on the body 14 at the juncture of the sides 15, 18, and 19. The surface 27 extends forwardly from the rear wall 27 and merges with a surface 28 which not only is inclined transversely of the body, but also longitudinally thereof so that the surface 28 slopes upwardly and rearwardly of the body 14.

The upper wall 18 of the body 14 is provided with a transversely extending recess 29 for a purpose presently to be explained.

The body 14 of the tooling support 3 is movable into and out of the chamber 13, and at its innermost position, the end wall 19 of the body 14 bears against and seats on the end wall 6 of the housing 2. Although the cross-sectional configurations of the chamber and the support generally correspond to one another, the cross-sectional area of the support is less than that of the chamber thereby providing a gap between the body and the side and top walls 4 and 7, respectively, of the chamber. See FIG. 5.

Locking means 30 is provided for securing the body member 14 snugly within the chamber 13. The locking means comprises a boss 31 extending from the upper wall 7 and having a threaded bore 32 therethrough. Threadedly accommodated in the bore 32 is a locking bolt 33 having a blunt end 34 adapted to seat on the inclined surface 28 of the body 14. The threads of the bolt and bore preferably are self-locking. A crank 35 projects outwardly from a collar 36 which is clamped by a clamping screw 37 to the bolt 33. Rotation of the bolt 33 in one direction causes the blunt end 34 to bear upon the inclined surface 28, whereas rotation of the bolt in the opposite direction disengages the end 34 from the body 14 to enable the latter to be moved into and out of the chamber.

Figure 5:
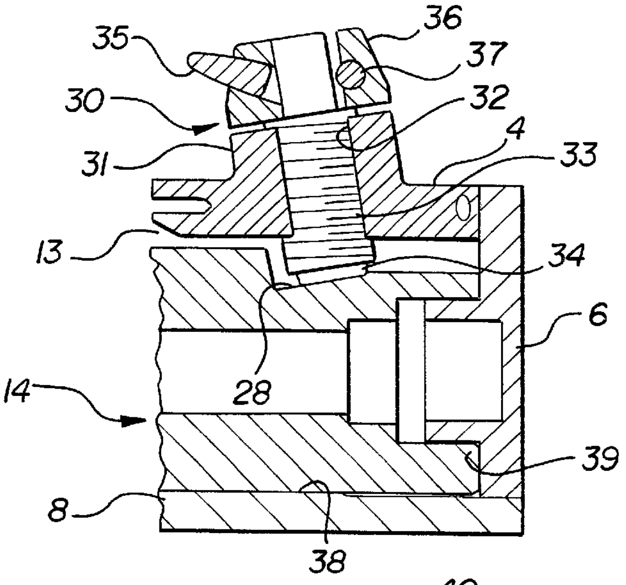
FIG. 5 is a fragmentary sectional view through one portion of the housing and illustrating the tooling support body within the housing.

As is shown clearly in FIG. 5 the longitudinal axis of the locking bolt 33 extends at an angle less than 90° to the longitudinal axis of the body 14, but substantially normal to the inclined surface 28. Thus, when the end 34 of the locking bolt bears upon the inclined surface 28, the body 14 will be urged simultaneously toward a seating surface 38 formed by the junctures of the bottom wall 8 and the side wall 5, and a seating surface 39 formed by the juncture of the walls 6 and 8 of the housing chamber. The inclination of the longitudinal axis of the locking screw 33 relative to the longitudinal axis of the body 14 is along a path that is diagonally toward the seating surfaces 38 and 39 so that the body constantly is urged toward and into engagement with the seating surfaces. As a consequence, whenever the support 3 is secured in the chamber, the position of the support will be the same in all three axes of possible motion.

Figure 2:
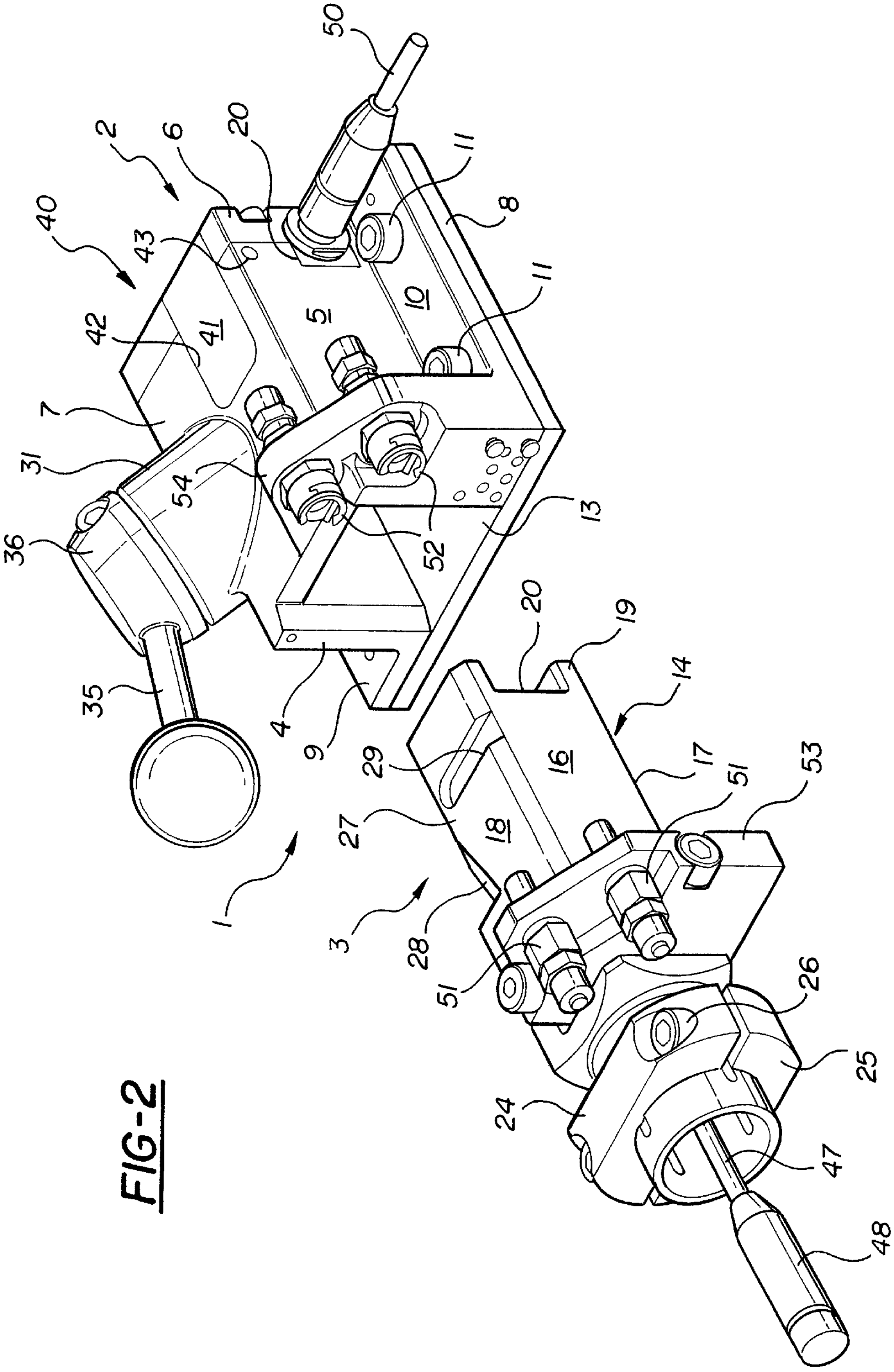
FIG. 2 is an isometric, exploded view of the parts shown in FIG. 1.
Figure 3:
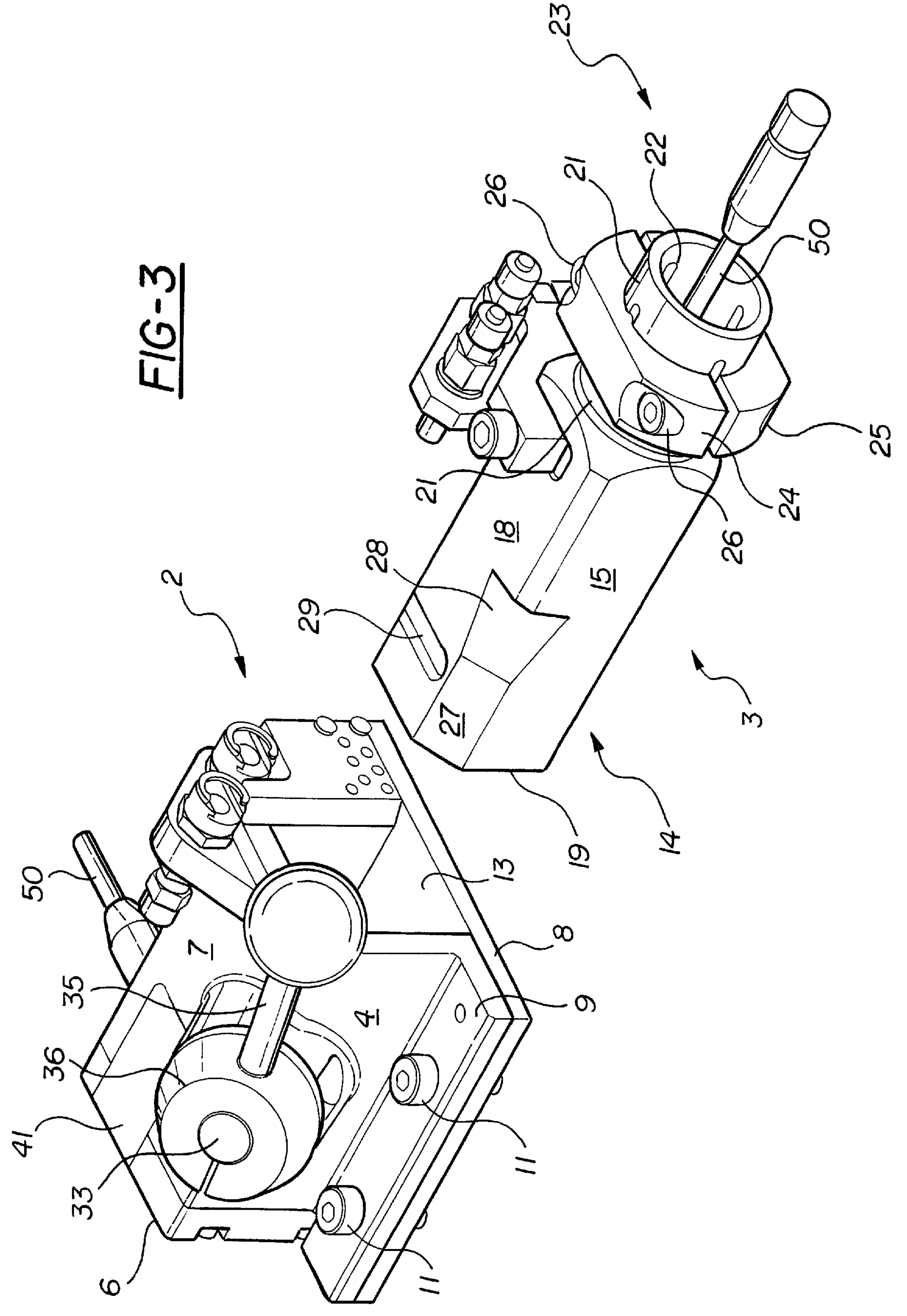
FIG. 3 is a view similar to FIG. 2, but taken from a different position.
Figure 6:
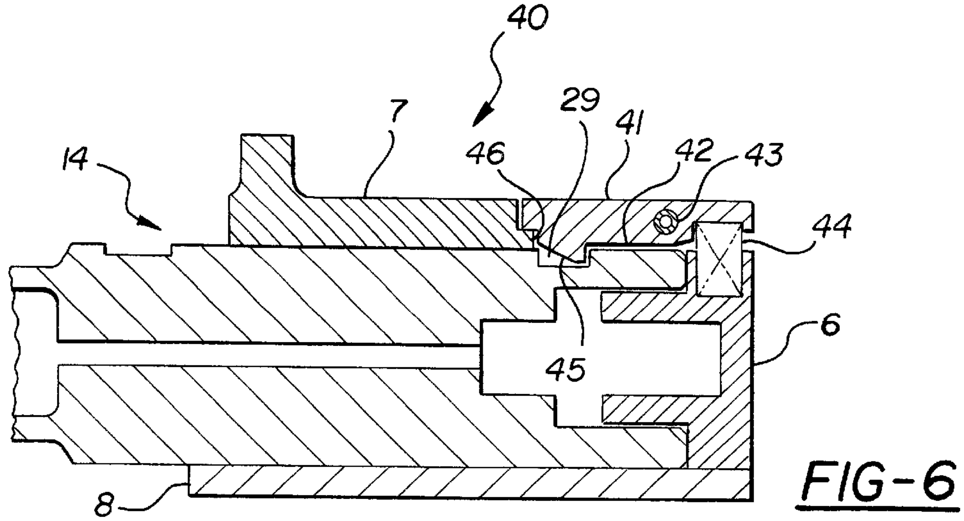
FIG. 6 is a fragmentary sectional view through another portion of the housing and illustrating the latching mechanism.

To guard against inadvertent withdrawal of the tooling support 3 from the chamber 13, cooperable latch means 40 is provided for releasably securing the body 14 within the chamber in the event proper adjustment of the locking means 30 is overlooked. The latch means comprises a finger 41 fitted into a recess 42 formed in the walls 6 and 7 for rocking movements about a pivot axis 43. A spring 44 constantly urges the finger 41 to rock counterclockwise, as viewed in FIGS. 1, 2, and 6 toward a latching position. The forward end of the latch finger 41 is provided with a downwardly extending tongue 45 which passes through a slot 46 in the top wall 7 for accommodation in the recess 29 of the body 14. The forward surface of the tongue 45 is so shaped as to enable the tongue to be cammed clockwise as the body 14 moves into the chamber. When the body 14 is seated in the chamber 13 the spring 44 maintains the latching tongue 45 in the groove 29.

As mentioned earlier the tooling support apparatus 1 is adapted for use with any one of a plurality of different kinds of workpiece transfer supports. One suitable support is disclosed in application Ser. No. 09/045,378 filed Mar. 19, 1998, the disclosure of which is incorporated by reference. If that support is used, or if any other support terminating in a sleeve at one end is used, such sleeve may be fitted into the cylindrical sleeve 21 and the clamp collar 23 manipulated to clamp the one sleeve within the other.

Figure 4:
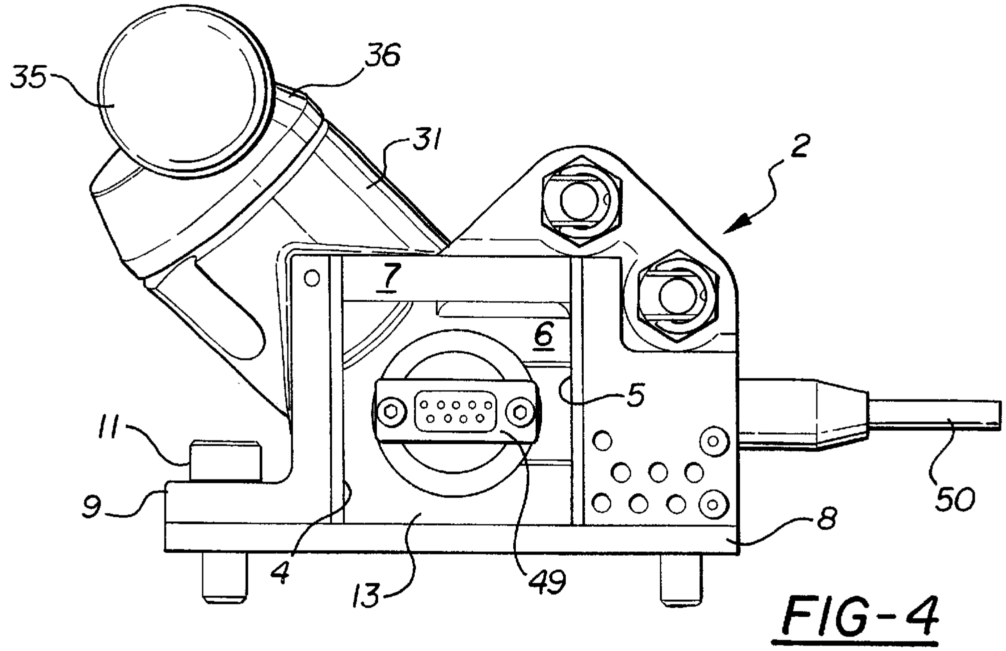
FIG. 4 is an end elevational view.

If the workpiece transfer support utilized has electrical workpiece sensing apparatus, the support member 14 may be provided with an electrical cord 47 terminating at one end in a plug 48 and at the other end in a coupling (not shown) having pins (not shown) adapted for movable accommodation in a socket 49 (FIG. 4) adapted for connection to a source of electrical energy via a supply cord 50 which enters the chamber 13 via an opening in the rear wall 6. The notch 20 is provided to accommodate the socket. Various kinds of electrical couplings and fittings 51 and 52 of conventional construction may be provided on supports 53 and 54, respectively, carried by the housing 2.

Since whatever workpiece support may be used is removable from the support member 14 simply by relieving the clamping force provided by the clamp 23 or by removing the support 3 from the housing 2, the latter may be located at any selected position along the rail 12 and the components supporting the workpiece transfer apparatus may be coupled to and uncoupled from the housing 2 extremely rapidly. If multiple, interchangeable workpiece support arms are provided, as is recommended, such support arms can be preadjusted during a production run of one kind of workpiece and prior to their being assembled with the housing 2, thereby enabling changeovers of workpiece supports to be effected rapidly.

The disclosed embodiment is representative of the presently preferred form of the invention, but is intended to be illustrative rather than definitive thereof. The invention is defined in the claims.

I claim:

1. A tooling support apparatus comprising:

a housing having a chamber open at one end thereof, said chamber having an end wall opposite said open end and a seating surface extending from said open end to said end wall;

a tooling support body removably accommodated in said chamber and extending outwardly of said chamber via said open end;

locking means supported by said housing for movements along a path into and out of engagement with said body when said body occupies said chamber, said locking means when in engagement with said body urging the latter toward said end wall and said seating surface; and cooperable engageable and disengageable latch means reacting between said housing and said body for releasably latching said body in said chamber independently of said locking means.

2. The apparatus according to claim 1 wherein said chamber has a selected cross-sectional configuration and size and said body has a cross-sectional configuration corresponding to that of said chamber and a cross-sectional area less than that of said chamber.

3. The apparatus according to claim 1 wherein the path of movement of said locking means is diagonally toward said end wall and said seating surface.

4. The apparatus according to claim 3 wherein said support body has an inclined surface engageable by said locking means.

5. The apparatus according to claim 1 wherein said latch means comprises a finger having a part thereof movable into and out of a groove formed in said body.

6. The apparatus according to claim 5 wherein said body has a slot through which said part of said finger extends.

7. The apparatus according to claim 1 wherein said locking means comprises a threaded bolt.

8. The apparatus according to claim 7 wherein said bolt has self-locking threads.

9. A tooling support apparatus comprising:

a housing having walls defining a chamber one end of which is open, the walls of said chamber including an end wall opposite said open end and a seating surface between said open end and said end wall;

a support body removably accommodated in said chamber and extending through said open end, said body and said chamber having complementary cross-sectional configurations but said chamber having a cross-sectional area greater than that of said body;

the cross-sectional area of said chamber being sufficiently larger than that of said body to ensure the presence of clearance between said body and the walls of said chamber when said body is within said chamber;

locking means carried by said housing for movements along a path in directions into and out of engagement with said body when the latter occupies said chamber, said path extending diagonally of said chamber in a direction partly toward said end wall and partly toward said seating surface thereby enabling said locking means when engaged with said body to cause the latter to bear against and seat on said end wall and said seating surface; and operating means for moving said locking means in a selected one of said directions.

10. The apparatus according to claim 9 including cooperable latch means reacting between said housing and said body when the latter occupies said chamber and seats on said end wall and said seating surface, said latch means having a latching position in which said latch means maintains said body in an immovable position in said chamber.

11. The apparatus according to claim 10 wherein said latch means comprises a finger having a part movable through a slot in said housing into and out of a groove formed in said body.

12. The apparatus according to claim 11 including spring means acting on said finger and yieldably biasing the latter to its latching position.

13. The apparatus according to claim 9 including coupling means carried by said body for separably coupling said body to a workpiece support.

14. The apparatus according to claim 13 including releasable clamp means for clamping and unclamping said coupling means to said workpiece support.

* * * * *